William C. Howard
INVENTOR.

William C. Howard
INVENTOR.

Aug. 1, 1961
W. C. HOWARD
2,994,188
COMBINATION PISTON AND TURBINE ENGINE
Filed Jan. 21, 1959
4 Sheets-Sheet 4
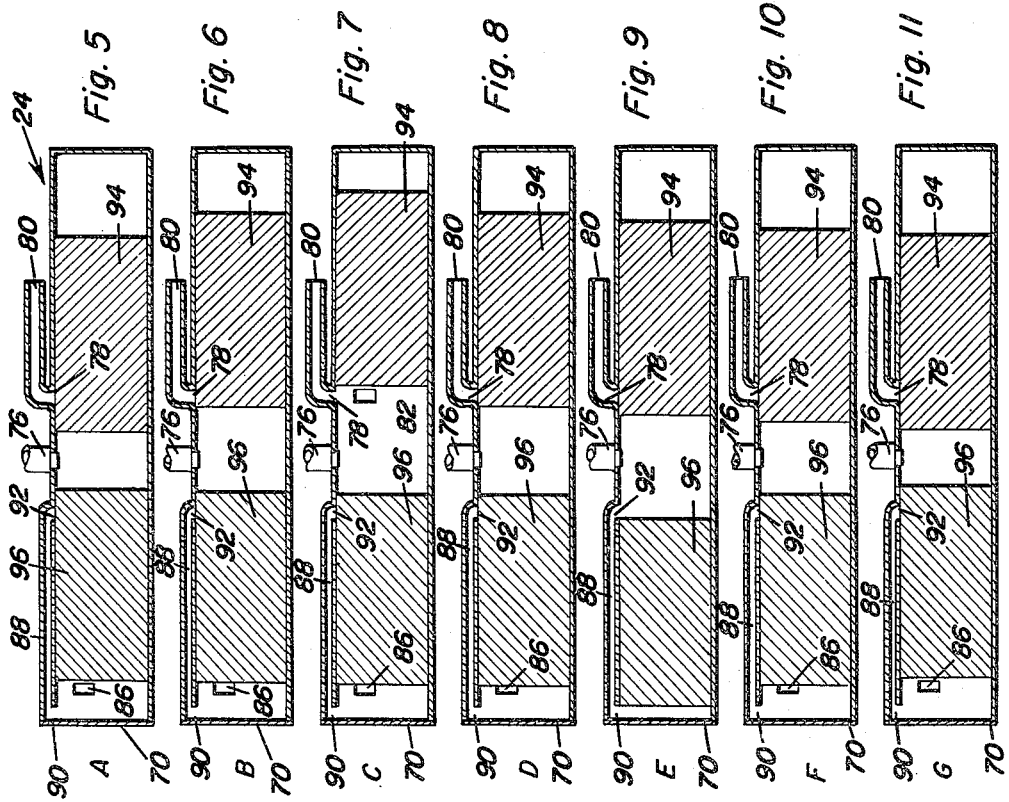
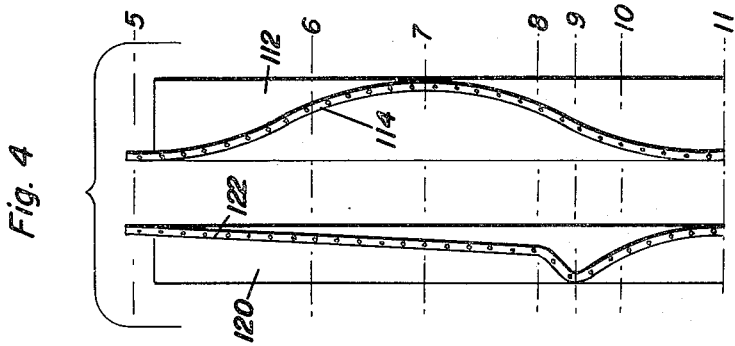
William C. Howard
INVENTOR.

United States Patent Office 2,994,188
Patented Aug. 1, 1961

2,994,188
COMBINATION PISTON AND TURBINE ENGINE
William C. Howard, P.O. Box 638, Olden, Tex., assignor of five percent to R. E. Head, five percent to W. D. R. Owen, five percent to Carol O'Neal Sandlin, twenty percent to H. T. Wilson, twenty percent to Don Pierson, and five percent to Frank Hernandez, all of Eastland, Tex., five percent to D. O. Collins, Midland, Tex., five percent to O. E. Holder, Dallas, Tex., and five percent to Edward T. Skinner, Dallas, Tex.
Filed Jan. 21, 1959, Ser. No. 788,203
9 Claims. (Cl. 60—13)

This invention relates in general to new and useful improvements in internal combustion engines, and more particularly to a combination piston and turbine engine.

The ordinary internal combustion engine as known to the public includes a rigid block in which there is rigidly mounted a crankshaft, the block having formed therein a plurality of cylinders in which pistons connected to the crankshaft reciprocate. Such an engine is very heavy in weight and is in no way flexible in its characteristics, the only change available to the manufacturer being in the particular type of camshaft and crankshaft used by him. For that reason once an internal combustion engine is designed by a manufacturer, little changes are made for a number of years inasmuch as when changes are made it is necessary for the manufacturer to completely retool.

It is therefore the primary object of this invention to provide an internal combustion engine which is flexible in its design, the internal combustion engine including a straight driveshaft which is mounted on a suitable frame and which has disposed thereabout in concentric relation a plurality of circumferentially spaced cylinders, the number of cylinders varying as is desired, the variable being controlled only by the construction of the frame and the number of seats formed in the frame for cylinders.

Another object of this invention is to provide an internal combustion engine wherein the cylinders thereof are mounted in circumferentially spaced relation about the driveshaft and the driveshaft has mounted thereon a cam member which is engaged by the pistons of the cylinders so that the reciprocatory force of the pistons may be converted into rotary movement of a driveshaft thus by changing the design of the cam member, the characteristics of the engine may be likewise changed.

Another object of this invention is to provide an improved internal combustion engine wherein there are provided a plurality of cylinders disposed in circumferentially spaced relation concentric to a driveshaft and each of the cylinders has positioned therein a pair of pistons which are in opposed relation, the driveshaft having mounted thereon two cam members, one of the cam members being connected to one set of pistons and the other cam members being connected to the other set of pistons, the two cam members having different characteristics whereby the individual pistons of a cylinder, while co-operating with each other, travel at different rates.

Still another object of this invention is to provide an improved internal combustion engine of the type which includes a blower for supplying air thereto, the blower being driven by means of a turbine, the turbine being driven from the exhaust gases of the internal combustion engine whereby no power normally transmitted to the driveshaft is utilized to drive the blower.

A further object of this invention is to provide an air cooled internal combustion engine wherein the individual cylinders are disposed in circumferentially spaced relation about the driveshaft, and the driveshaft is provided with a centrally located fan, which fan blows cooling air about the cylinders.

A still further object of this invention is to provide an internal combustion engine wherein each cylinder thereof has a pair of pistons mounted therein in opposed relation, the pistons being connected to the driveshaft by means of cam members, the cam members having different characteristics whereby one of the pistons has a longer stroke than the other of the pistons and the characteristics of the strokes of the pistons are different whereby the pistons may properly uncover ports in the cylinder in the proper sequence.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a developed view of one half of each of the cam members and shows the specific lay-out of the cam members;

FIGURES 5, 6, 7, 8, 9, 10 and 11 are schematic views showing the relative movement of the piston of one of the cylinders and the sequence in which they uncover and close ports of the cylinder during the revolution of the internal combustion engine through an angle of 180°.

Figure 1:
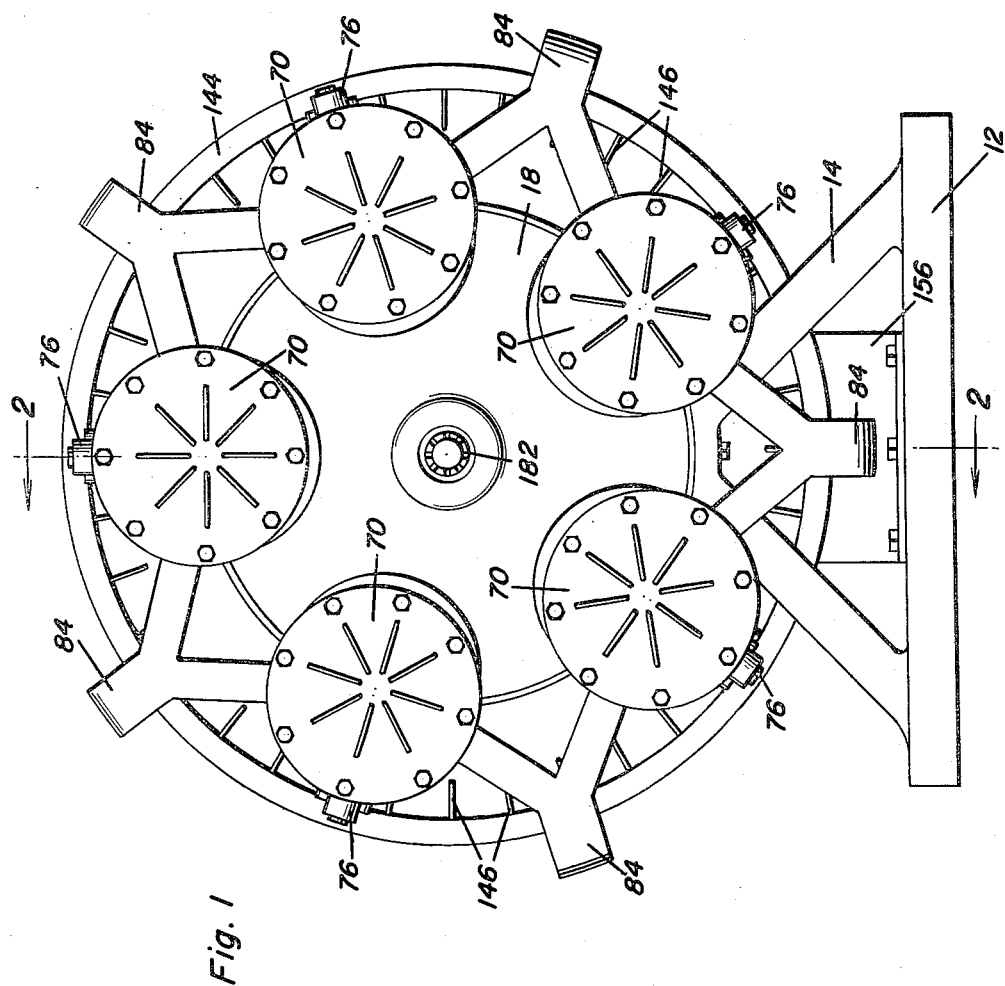
FIGURE 1 is an end view of the internal combustion engine which is the subject of this invention and shows the general arrangement of the cylinders thereof.
Figure 3:
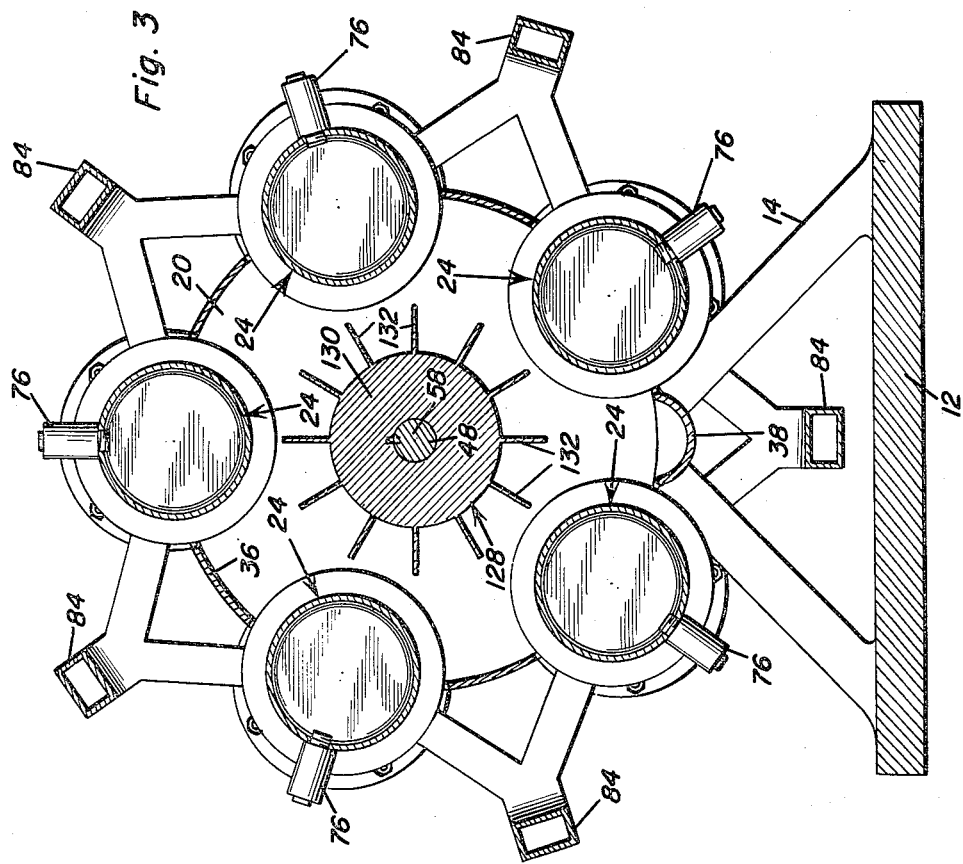
FIGURE 3 is a transverse vertical sectional view taken substantially upon the plane indicated by the section line 3—3 of FIGURE 2 and shows the general details of the cooling fan mounted within the confines of the internal combustion engine.

Referring now to the drawings in detail, it will be seen that the internal combustion engine, which is the subject of this invention, is referred to in general by the reference numeral 10. The internal combustion engine 10 includes a mounting base 12 which has extending upwardly therefrom at spaced intervals a pair of supports 14 and 16, the outlines of the supports being best illustrated in FIGURES 1 and 3. Suitably secured to the support 14 is an end plate 18 and a main frame member 20. Secured to the support 16 in alignment therewith is a main frame member 22. The main frame members 20 and 22, like the cover plate 18, may be machined of plate material or may be suitably cast. In any event, it is to be understood that the main frame members 20 and 22 and the cover plate 18 may vary depending upon the requirements of the particular internal combustion engine. Each of these is provided with a number of circumferentially spaced cut-outs, as is best shown in FIGURE 3, to receive a plurality of circumferentially spaced cylinders, each of which is referred to in general by the reference numeral 24. The cylinders 24 are secured in place by means of attaching flanges 26 and 28 which oppose the cover plate 18 and a rear cover plate 30 whose details will be described hereinafter. The flange 26 is secured to the cover plate 18 by means of a fastener 32 and the flange 28 is secured to the cover plate 30 by means of a fastener 34.

Extending about the central part of the internal combustion engine 10 and secured to the frame members 20 and 22 is a housing 36 which is best illustrated in FIGURE 3. The housing 36 is interrupted at intervals to provide space for the individual cylinders 24. The housing 36 also has a depressed bottom portion which forms an oil sump 38. As is best illustrated in FIG- URE 2, the housing 36 extends rearwardly of the frame 22 and provides a support for the rear cover plate 30. It is also to be noted that the housing 36 is secured in place by the same fasteners which secure the cover plate 18 and the frame members 20 and 22 to their respective supports 14 and 16.

The cover plate 18 is positioned in a bearing 40. The bearing 40 is aligned with a bearing 42 carried by the frame 20 a bearing 44 carried by the frame 22 and a bearing 46 carried by the cover plate 30. Rotatably journalled within the bearings 40, 42, 44 and 46 is a driveshaft 48.

Mounted within the frame member 22 is an oil pump 50 to which there is connected an intake passage 52 extending through the frame member 22 and which terminates at its lower end in a pick-up tube 54 which extends into the sump 38. The oil pump 50 includes an impeller 56 which is carried by the driveshaft 48. The driveshaft 48 has an oil passage 58 extending therethrough which is in turn connected to the outlet passage 60 of the oil pump 50. Thus lubrication to the bearings 40, 42, and 44 is provided through the driveshaft 48. The bearing 46 is also lubricated in the same manner. The cover plate 18 is provided with a seal 62 to prevent the flow of lubricating oil out therethrough about the driveshaft 48. A similar seal 64 is carried by the cover plate 30. Although they have not been so illustrated, it is to be understood that the frame members 20 and 22 will have suitable openings formed therein in order that excess oil from the various components exposed exteriorly thereof may return to the sump 38.

Inasmuch as each of the cylinders 24 is identical, only one of the cylinders will be described in detail. Each cylinder 24 includes an elongated barrel 66 which is closed at the right end thereof, as viewed in FIGURE 2, by an end wall 68. The opposite end of the barrel 66 is closed by a removable cylinder head 70. In order that the cylinder 24 may be cooled in the area of the combustion chamber therein, the central part of each of the barrels 66 is provided with suitable cooling fins 74.

Figure 2:
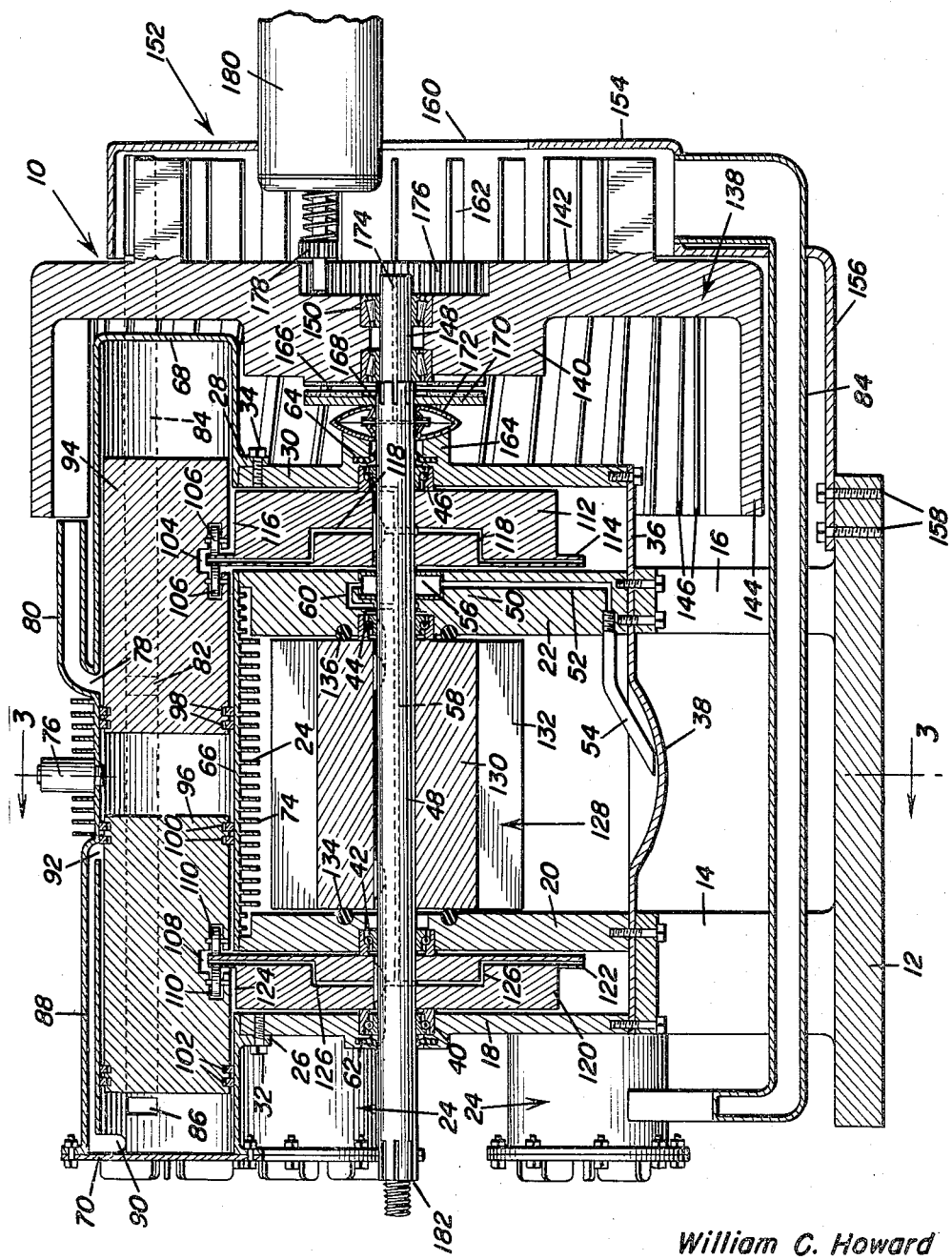
FIGURE 2 is a longitudinal vertical sectional view taken substantially upon the plane indicated by the section line 2—2 of FIGURE 1 and shows the internal construction of the internal combustion engine.

Disposed intermediate the ends of each of the cylinders 24 is a suitable fuel injector 76 which is conventional and no further details of which are illustrated. Disposed to the right of the fuel injectors 76 as viewed in FIGURE 2, is an exhaust port 78 which opens into an exhaust passage 80 which runs to the right parallel to the axis of the cylinder 24. Circumferentially spaced from the exhaust port 78 but aligned therewith is a scavenging port 82. The scavenging port 82 is connected to a pressurized air duct 84 whose details are best illustrated at the bottom of FIGURE 2. At this point it is to be noted that there are two scavenging ports 82 with the scavenging ports being arranged at approximately a 75° angle on each side of the exhaust ports 78.

In alignment with the scavenging ports 82, but disposed adjacent the cylinder head 70 in spaced relation to the cylinder head 70 is a pair of air-intake ports 86 which are also connected to the air duct 84. Further, the left part of each of the cylinders 24 has formed as an integral part thereof a by-pass passage 88. The by-pass passage 88 opens at the left end thereof into the barrel 66 as at 90 immediately adjacent the cylinder head 70. The right end of the by-pass passage 88 opens into the cylinder 24 adjacent the fuel injector 76 in the form of an intake port 92.

Mounted within each of the cylinders 24 is a pair of pistons 94 and 96, the pistons 94 being disposed in the right part of each of the cylinders 24 and the piston 96 being disposed in the left part of each of the cylinders 24. The pistons 94 and 96 may be of any desired construction although it is necessary that the piston 96 be of the double-ended type. The piston 94 is provided adjacent the left end thereof with suitable rings 98 to form the desired seal with the wall of the barrel 66. On the other hand, the piston 96 is provided with suitable rings 100 adjacent the right ends thereof and rings 102 adjacent the left end thereof, to provide seals at both ends of the piston 96.

A piston 94 has a recess 104 formed therein in opposed relation to the driveshaft 48. The recess 104 has opening thereinto a pair of rollers 106 which are in spaced opposed relation. The piston 96 has a similar recess 108 formed therein into which there are opened opposed rollers 110. The rollers 110 are also in spaced relation.

Figure 12:
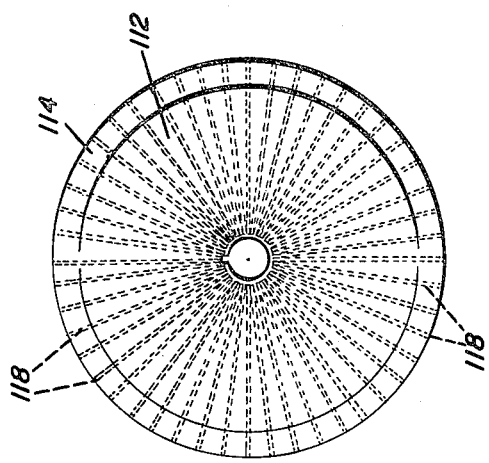
FIGURE 12 is an elevational view of one of the cam members and shows the arrangement of oil passages therein.

Secured to the driveshaft 48 for rotation therewith and positioned between the frame member 22 and the cover plate 30 is a cam member 112 having a circumferentially extending came surface 114. The cam surface 114 projects into the cylinder 24 through an opening 116 in the barrel 66 and is positioned between the rollers 106. The design of the cam surface 114 is such that it is repeated every 180°. The contact surface between the cam surface 114 and the rollers 106 is lubricated by means of an oil passage 118 extending from the driveshaft 48 and opening through the cam surface 114. It is to be understood that there will be a large number of such oil passages 118, as is best illustrated in FIGURE 12.

The driveshaft 48 has also mounted thereon a cam member 120. The cam member 120 is disposed intermediate the cover plate 18 and the frame member 20. The cam member 120 includes a cam surface 122. However, while the cam surface 122 is somewhat similar to the cam surface 114, the characteristics thereof are entirely different from the characteristics of the cam surface 114, as will be described in more detail hereinafter. The cam surface 122 extends into the cylinder 24 through an opening 124 in the left part of the barrel 66. The cam surface 122 is disposed intermediate the rollers 110 and thus the piston 96 is connected to the cam 120. Lubrication to the rollers 110 is accomplished by means of a plurality of radiating oil passages 126 formed in the cam member 120 and extending out through the peripheral edge of the cam surface 122, the oil passages 126 being communicative with the oil passage 58 of the driveshaft 48.

In order that the individual cylinders 24 may be cooled, there is mounted on the driveshaft 48 intermediate the frame members 20 and 22 a fan which is referred to in general by the reference numeral 128. The fan 128 includes a hub 130 having a plurality of vanes 132 extending radially therefrom, as is best illustrated in FIGURE 3. The fan 128 is keyed on the driveshaft 48. As the driveshaft 48 rotates, the fan 128 will circulate air within the housing 36 and pass such air through the cooling fins 74 of the cylinders 24. Incidentally, it is pointed out that the ends of the hub 130 are sealed with respect to the frame member 20 by a sealing ring 134 and to the frame member 22 by a sealing ring 136.

Mounted on the rear part of the driveshaft 48, that is the right hand side of the driveshaft 48 as illustrated in FIGURE 2, is a turbine member which is referred to in general by the reference numeral 138. The turbine member 138 includes a hub 140 which has extending outwardly therefrom a plate portion 142 which in turn has formed integral therewith an annular flange 144 which is disposed about the right ends of the cylinders 24. Projecting inwardly from the flange 144 is suitable blading 146. It is to be noted that the exhaust passages are directed towards the blading 146 of the turbine member 138 so that the exhaust gases from the cylinders 24 serve to drive the turbine member 138.

At this time, it is pointed out that the right end of the shaft 48 is reduced as at 148 and that the hub 140 of the turbine member 138 is mounted on the reduced end 148 of the driveshaft 48 for independent rotation by means of a pair of bearings 150.

At the extreme right end of the internal combustion engine 10 is a blower assembly which is referred to in general by the reference numeral 152. The blower assembly 152 includes a housing 154 which is supported from the base 12 by means of a bracket 156, the bracket 156 being secured to the base 12 by means of fasteners 158. The housing 154 has formed therein a circular opening 160 through which air may pass into the housing 154.

The blower unit 152 also includes a blading 162. The blading 162 is carried by the plate portion 142 of the turbine member 138. Thus, the blower unit 152 functions in unison with the turbine member 138. Inasmuch as the blower unit 152 is driven by a turbine member 138, it will be seen that the exhaust gases of the internal combustion engine serves to drive the blower for furnishing compressed air to the individual cylinders 24.

The cover plate 30 has a hub portion 164 which projects toward the hub 140 of the turbine member 138. Formed on the hub 140 is a clutch disk 166. Suitably splined on the driveshaft 48 as at 168 is a clutch plate 170. Carried by the hub 164 is an expandable pressure member 172 which bears against the clutch plate 170. The expandable pressure member 172 is in the form of a bellows and is preferably formed of resilient material so that it normally retains the clutch plate 170 out of engagement with the clutch disk 166. The driveshaft 148 has a passage 174 through the right end thereof which opens into the pressure member 172. A suitable fluid line may be connected to the driveshaft 148 by a swivel connection (not shown) so that the interior of the pressure member 172 may be selectively pressurized so as to move the clutch plate 170 into engagement with the clutch disk 166 so as to drivingly connect the turbine member 138 to the driveshaft 48 for starting purposes.

Formed in the hub portion 140 of the turbine member 138 at the right end thereof is an internal gear 176. The internal gear 176 is adapted to have meshed therewith a starter drive gear 178 which is part of a starter 180. The starter 180 may be mounted in any conventional manner and will be provided with a suitable drive so as to engage the starter gear 178 with the internal gear 176 of the turbine member 138. After the turbine member 138 has been rotating a while and is at the desired speed for the blower unit 152 to function, then the clutch of which the clutch disk 166 and the clutch plate 168 are parts may be engaged so as to rotate the driveshaft 48 to start the internal combustion engine 10. During operation of the engine 10 the clutch is engaged and when it is desired to start the engine 10 the clutch is first disengaged in order to facilitate the spinning of the turbine member 138 at high speeds. Then, the clutch is engaged and the inertia of the spinning turbine member 138 aids in rotating the driveshaft 48 to start the engine 10.

At this time it is to be pointed out that the internal combustion engine 10 will have accessories such as a generator, a fuel pump, controls, etc. However, inasmuch as these are conventional and in themselves do not constitute a part of the present invention, they have not been specifically illustrated. Also, it is to be noted that the left end of the driveshaft 48 is machined as at 182 so that it may be coupled to some suitable power take-off.

Referring now to FIGURE 4 in particular, it will be seen that the cam surface 114 is of a different design from the cam surface 122. The direction of rotation of the engine is such that the followers for the individual pistons will move from the top to the bottom of the view. Thus when the internal combustion engine 10 operates, the piston 94 will begin to move to the right at the normal rate whereas the piston 96 will move to the left very slowly. When the piston 94 has reached the extent of its movement to the right, the piston 96 is still moving to the left. In fact, the piston 96 continues to move to the left until near the end of the cycle at which time it quickly moves to the left and then quickly returns to the right so as to return to its original position and at the same time the piston 94 returns to its original position.

Referring now to FIGURES 5 through 11, inclusive, it will be seen that in FIGURE 5 there is shown the original opposed positions of the pistons 96 and 94. At this time only the port 86 and the inlet 90 to the by-pass passage 88 are open. Fuel is injected through the injector 76 and firing takes place. The pistons 94 and 96 are driven apart with the piston 94 moving very fast while the piston 96 moves relatively slow. This is shown in FIGURE 6. FIGURE 7 shows that the piston 94 has uncovered both the exhaust ports 78 and the scavenging port 82 so that the exhaust gases between the pistons 94 and 96 may be exhausted and replaced by fresh air. At this time, the piston 96 has begun to cover the port 86. This is the outstroke position of the piston 94.

Referring now to FIGURE 9, which corresponds to line 9 of FIGURE 4, it will be seen that the piston 94 is moving on its instroke while the piston 96 has reached the end of its outstroke, the port 86 having been closed and the intake port 92 having been opened. Thus the gases trapped between the piston 96 and the cylinder head 70 have been compressed and are forced into the space between the pistons 94 and 96.

In FIGURE 10, the piston 96 has begun to move inwardly from its outstroke position of FIGURE 9 and is rapidly moving back towards its instroke position which it assumes in FIGURE 11. This completes the cycle.

From the foregoing, it will be seen that the piston 94 travels in the normal manner whereas the piston 96 travels a lesser distance than the piston 94 and momentarily at an accelerated rate. This, however, is permitted in view of the construction of the cam surfaces 114 and 122.

From the foregoing, it will be seen that there has been devised a highly desirable internal combustion engine, which internal combustion engine has a novel piston drive arrangement and which will produce the desired scavenging and compression through the abnormal cam members. Furthermore, it will be readily apparent that there has been devised a highly desirable engine assembly wherein the individual cylinders of the internal combustion engine may be arranged in any desired number without requiring any changes in the construction of either the crankshaft or the cam members. Further, the same cylinders can be used irrespective of the numeral of cylinders used.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A barrel engine comprising a centrally located driveshaft having a plurality of cylinders parallel to said driveshaft, a pair of pistons mounted in each of said cylinders in opposed relation, a pair of cam members secured to said driveshaft in spaced relation, each piston of each of said cylinders being engaged with one of said cam members, an intake port, a scavenging port and an exhaust port in each of said cylinders, one of said pistons of each cylinder controlling flow through said intake port and the other of said pistons of each cylinder controlling flow through said scavenging and exhaust ports.

2. A barrel engine comprising a centrally located driveshaft having a plurality of cylinders parallel to said driveshaft, a pair of pistons mounted in each of said cylinders in opposed relation, a pair of cam members secured to said driveshaft in spaced relation, each piston of each of said cylinders being engaged with one of said cam members, an intake port, a scavenging port and an exhaust port in each of said cylinders, one of said pistons of each cylinder controlling flow through said intake port and the other of said pistons of each cylinder controlling flow through said scavenging and exhaust ports, the end of each of said cylinders in which said one piston is disposed being closed and provided with intake means, by-pass means communicating said closed end of said cylinders with said intake ports, said one piston on its outstroke closing said intake means and opening said intake port, a blower rotatably mounted on said driveshaft, means for selectively drivingly connecting said blower to said driveshaft, air passages from said blower leading to said intake means and said scavenging ports.

3. A barrel engine comprising a centrally located driveshaft having a plurality of cylinders parallel to said driveshaft, a pair of pistons mounted in each of said cylinders in opposed relation, a pair of cam members secured to said driveshaft in spaced relation, each piston of each of said cylinders being engaged with one of said cam members, an intake port, a scavenging port and an exhaust port in each of said cylinders, one of said pistons of each cylinder controlling flow through said intake port and the other of said pistons of each cylinder controlling flow through said scavenging and exhaust ports, the end of each of said cylinders in which said one piston is disposed being closed and provided with intake means, by-pass means communicating said closed end of said cylinders with said intake ports, said one piston on its outstroke closing said intake means and opening said intake port, said exhaust ports opening into exhaust passages, a turbine member mounted on said driveshaft for independent rotation, said exhaust passages directing exhaust gases against said turbine member for driving said turbine member, a blower connected with said turbine member, air passages leading from said blower to said intake means and scavenging ports.

4. An internal combustion engine comprising a centrally located driveshaft, a plurality of cylinders extending parallel to said driveshaft, said cylinders being disposed in circumferentially spaced relation about said driveshaft, a pair of pistons mounted in each of said cylinders in opposed relation, a pair of cam members secured to said driveshaft in spaced relation, each piston of each of said cylinders being engaged with one of said cam members, an intake port and an exhaust port in each of said cylinders, one of said pistons of each cylinder controlling flow through said intake port and the other of said pistons of each cylinder controlling flow through said exhaust port, a cylinder head on each of said cylinders remote from said other piston, said one piston being double-ended, a by-pass passage extending from each cylinder adjacent said cylinder head to said intake port, an air intake in each cylinder intermediate the ends of said by-pass passage and in communication with said passage and closable by said one piston whereby said one piston serves to compress the intake air prior to passage through said intake port.

5. An internal combustion engine comprising a centrally located driveshaft, a plurality of cylinders extending parallel to said driveshaft, said cylinders being disposed in circumferentially spaced relation about said driveshaft, a pair of pistons mounted in each of said cylinders in opposed relation, a pair of cam members secured to said driveshaft in spaced relation, each piston of each of said cylinders being engaged with one of said cam members, an intake port and an exhaust port in each of said cylinders, one of said pistons of each cylinder controlling flow through said intake port and the other of said pistons of each cylinder controlling flow through said exhaust port, a cylinder head on each of said cylinders remote from said other piston, said one piston being double-ended, a by-pass passage extending from each cylinder adjacent said cylinder head to said intake port, an air intake in each cylinder intermediate the ends of said by-pass passage and in communication with said passage and closable by said one piston whereby said one piston serves to compress the intake air prior to passage through said intake port, a scavenging port in each of said cylinders adjacent said exhaust port, said other piston controlling flow through said scavenging port.

6. An internal combustion engine comprising a centrally located driveshaft, a plurality of cylinders extending parallel to said driveshaft, said cylinders being disposed in circumferentially spaced relation about said driveshaft, a pair of pistons mounted in each of said cylinders in opposed relation, a pair of cam members secured to said driveshaft in spaced relation, each piston of each of said cylinders being engaged with one of said cam members, said cam members having different characteristics, the cam member engaged with one piston in a cylinder effecting shorter strokes of that piston than the strokes of the other piston in that same cylinder effected by the other cam member.

7. An internal combustion engine comprising a centrally located driveshaft, a plurality of cylinders extending parallel to said driveshaft, said cylinders being disposed in circumferentially spaced relation about said driveshaft, a pair of pistons mounted in each of said cylinders in opposed relation, a pair of cam members secured to said driveshaft in spaced relation, each piston of each of said cylinders being engaged with one of said cam members, an intake port and an exhaust port in each of said cylinders, one of said pistons of each cylinder controlling flow through said intake port and the other of said pistons of each cylinder controlling flow through said exhaust port, said cam members having different characteristics, the cam member engaged with one piston in a cylinder effecting shorter strokes of that piston than the strokes of the other piston in that same cylinder effected by the other cam member.

8. An internal combustion engine comprising a centrally located driveshaft, a plurality of cylinders extending parallel to said driveshaft, said cylinders being disposed in circumferentially spaced relation about said driveshaft, a pair of pistons mounted in each of said cylinders in opposed relation, a pair of cam members secured to said driveshaft in spaced relation, each piston of each of said cylinders being engaged with one of said cam members, an intake port and an exhaust port in each of said cylinders, one of said pistons of each cylinder controlling flow through said intake port and the other of said pistons of each cylinder controlling flow through said exhaust port, a scavenging port in each of said cylinders adjacent said exhaust port, said other piston controlling flow through said scavenging port, said cam members having different characteristics, the cam member engaged with one piston in a cylinder effecting shorter strokes of that piston than the strokes of the other piston in that same cylinder effected by the other cam member.

9. An internal combustion engine comprising a centrally located driveshaft, a plurality of cylinders extending parallel to said driveshaft, said cylinders being disposed in circumferentially spaced relation about said driveshaft, a pair of pistons mounted in each of said cylinders in opposed relation, a pair of cam members secured to said driveshaft in spaced relation, each piston of each of said cylinders being engaged with one of said cam members, an intake port and an exhaust port in each of said cylinders, one of said pistons of each cylinder controlling flow through said intake port and the other of said pistons of each cylinder controlling flow through said exhaust port, a scavenging port in each of said cylinders adjacent said exhaust port, said other piston controlling flow through said scavenging port, said cam members having different characteristics, the cam member engaged with one piston in a cylinder effecting shorter strokes of that piston than the strokes of the other piston in that same cylinder effected by the other cam member, the characteristics of said cam members being such that said exhaust ports and said scavenging ports are opened to exhaust gases from said cylinders and to scavenge said cylinders, then said exhaust ports and said scavenging ports are closed, next said intake ports are opened, and then said intake ports are closed.

References Cited in the file of this patent

UNITED STATES PATENTS

| | | |
|---|---|---|
| 1,808,083 | Tibbetts | June 2, 1931 |
| 1,961,905 | Michell | June 5, 1934 |
| 2,080,846 | Alfaro | May 18, 1937 |
| 2,276,772 | Heap | Mar. 17, 1942 |
| 2,278,181 | Lieberherr | Mar. 31, 1942 |